United States Patent
King et al.

(10) Patent No.: US 6,693,954 B1
(45) Date of Patent: Feb. 17, 2004

(54) APPARATUS AND METHOD OF EARLY-LATE SYMBOL TRACKING FOR A COMPLEMENTARY CODE KEYING RECEIVER

(75) Inventors: Eric J. King, Greensboro, NC (US); Peijun Shan, Jamestown, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 0 days.

(21) Appl. No.: 09/550,786

(22) Filed: Apr. 17, 2000

(51) Int. Cl.$^7$ .............................................. H04B 1/707
(52) U.S. Cl. ..................................................... 375/147
(58) Field of Search ................................. 375/130, 141, 375/147, 200, 206, 316, 335; 370/335

(56) References Cited

U.S. PATENT DOCUMENTS

| | | | |
|---|---|---|---|
| 4,454,604 A | 6/1984 | Myers | 375/1 |
| 4,476,458 A | 10/1984 | Dollard | 340/347 DD |
| 4,941,154 A | 7/1990 | Wei | 375/39 |
| 5,077,753 A | 12/1991 | Grau, Jr. et al. | 375/1 |
| 5,216,693 A | 6/1993 | Nakamura | 375/1 |
| 5,301,206 A | 4/1994 | Ishigaki et al. | 375/1 |
| 5,357,454 A * | 10/1994 | Dent | 708/410 |
| 5,412,687 A | 5/1995 | Sutton et al. | 375/202 |
| 5,463,657 A | 10/1995 | Rice | 375/200 |
| 5,528,624 A | 6/1996 | Kaku et al. | 375/206 |
| 5,566,214 A * | 10/1996 | Kroeger et al. | 375/355 |
| 5,579,338 A | 11/1996 | Kojima | 375/208 |
| 5,581,585 A | 12/1996 | Takatori et al. | 375/376 |
| 5,604,772 A | 2/1997 | Botto et al. | 375/341 |
| 5,608,722 A | 3/1997 | Miller | 370/320 |
| 5,640,416 A | 6/1997 | Chalmers | 375/206 |
| 5,651,032 A | 7/1997 | Okita | 375/341 |
| 5,656,976 A | 8/1997 | Jung et al. | 331/18 |
| 5,717,706 A | 2/1998 | Ikeda | 371/43 |
| 5,764,687 A | 6/1998 | Easton | 375/206 |
| 5,809,060 A | 9/1998 | Cafarella et al. | 375/206 |
| 5,914,949 A | 6/1999 | Li | 370/342 |
| 6,029,116 A | 2/2000 | Wright et al. | 702/32 |

(List continued on next page.)

OTHER PUBLICATIONS

Chiueh and Li, Trellis–Coded Complementary Code Keying for High–Rate Wireless LAN Systems, May 2001, IEEE Communications Letters, vol. 5, No. 5, pp.: 191–193.*
Halford et al., Complementary Code Keying For Rake–Based Indoor Wireless Communications, May 30–Jun. 2, 1999, Proceedings of the 1999 IEEE International Symposium on Circuits and systems, vol. 4, pp.: 427–430.*
Kuganesan, P.; Letaief, K.B.; Yue Chen; Multicode Modulation for High–Speed Wireless Data Transmission, Sep. 1–4, 1997, Personal, Indoor and Mobile Radio Communications, Vo. 2, pp.: 457–461.*

Primary Examiner—Stephen Chin
Assistant Examiner—Lawrence Williams
(74) Attorney, Agent, or Firm—Withrow & Terranova, PLLC (57) ABSTRACT

The receiver receives a complex spread spectrum signal modulated using complementary code keying. The received signal is down converted and cross correlated with code words using a Fast Walsh Transform. The peak magnitudes resulting from the Fast Walsh Transform are selected for a period before, during, and after an expected symbol boundary. The relative magnitudes of the early, on-time and late measurements are compared to determine which output has the largest magnitude. If the on-time measurement is the largest, symbol tracking continues without a timing adjustment. If the early measurement has the greatest magnitude, then the tracking timing is adjusted one period downward to shorten the period expected before the next symbol boundary. If the late measurement has the largest magnitude, then the tracking timing is increased by one sample period to increase the period expected before the next symbol boundary. This process repeats itself to provide accurate symbol tracking.

17 Claims, 8 Drawing Sheets

U.S. PATENT DOCUMENTS

| | | | |
|---|---|---|---|
| 6,075,807 A | 6/2000 | Warren et al. | 375/143 |
| 6,075,812 A | 6/2000 | Cafarella et al. | 375/206 |
| 6,108,324 A * | 8/2000 | Brown et al. | 370/335 |
| 6,115,431 A | 9/2000 | Lee | 375/324 |
| 6,324,235 B1 | 11/2001 | Savell et al. | 375/372 |
| 6,430,212 B1 | 8/2002 | Alisobhani et al. | 375/141 |
| 6,456,646 B1 | 9/2002 | Asokan et al. | 375/142 |
| 6,526,091 B1 | 2/2003 | Nystrom et al. | 375/142 |
| 2002/0122466 A1 * | 9/2002 | Somayazulu | 375/142 |
| 2002/0124036 A1 * | 9/2002 | Rawlins et al. | 708/422 |
| 2003/0103004 A1 * | 6/2003 | Arndt et al. | 342/465 |

* cited by examiner

| Code Index | | Length-8 Code Words | | | | | | | |
|---|---|---|---|---|---|---|---|---|---|
| 0 | 000000 | +1 | +1 | +1 | -1 | +1 | +1 | -1 | +1 |
| 1 | 000001 | +j | +j | +j | -j | +1 | +1 | -1 | +1 |
| 2 | 000010 | -1 | -1 | -1 | +1 | +1 | +1 | -1 | +1 |
| 3 | 000011 | -j | -j | -j | +j | +1 | +1 | -1 | +1 |
| 4 | 000100 | +j | +j | +1 | -1 | +j | +j | -1 | +1 |
| 5 | 000101 | -1 | -1 | +j | -j | +j | +j | -1 | +1 |
| 6 | 000110 | -j | -j | -1 | +1 | +j | +j | -1 | +1 |
| 7 | 000111 | +1 | +1 | -j | +j | +j | +j | -1 | +1 |
| 8 | 001000 | -1 | -1 | +1 | -1 | -1 | -1 | -1 | +1 |
| 9 | 001001 | -j | -j | +j | -j | -1 | -1 | -1 | +1 |
| 10 | 001010 | +1 | +1 | -1 | +1 | -1 | -1 | -1 | +1 |
| 11 | 001011 | +j | +j | -j | +j | -1 | -1 | -1 | +1 |
| 12 | 001100 | -j | -j | +1 | -1 | -j | -j | -1 | +1 |
| 13 | 001101 | +1 | +1 | +j | -j | -j | -j | -1 | +1 |
| 14 | 001110 | +j | +j | -1 | +1 | -j | -j | -1 | +1 |
| 15 | 001111 | -1 | -1 | -j | +j | -j | -j | -1 | +1 |
| 16 | 010000 | +j | +1 | +j | -1 | +j | +1 | -j | +1 |
| 17 | 010001 | -1 | +j | -1 | -j | +j | +1 | -j | +1 |
| 18 | 010010 | -j | -1 | -j | +1 | +j | +1 | -j | +1 |
| 19 | 010011 | +1 | -j | +1 | +j | +j | +1 | -j | +1 |
| 20 | 010100 | -1 | +j | +j | -1 | -1 | +j | -j | +1 |
| 21 | 010101 | -j | -1 | -1 | -j | -1 | +j | -j | +1 |
| 22 | 010110 | +1 | -j | -j | +1 | -1 | +j | -j | +1 |
| 23 | 010111 | +j | +1 | +1 | +j | -1 | +j | -j | +1 |
| 24 | 011000 | -j | -1 | +j | -1 | -j | -1 | -j | +1 |
| 25 | 011001 | +1 | -j | -1 | -j | -j | -1 | -j | +1 |
| 26 | 011010 | +j | +1 | -j | +1 | -j | -1 | -j | +1 |
| 27 | 011011 | -1 | +j | +1 | +j | -j | -1 | -j | +1 |
| 28 | 011100 | +1 | -j | +j | -1 | +1 | -j | -j | +1 |
| 29 | 011101 | +j | +1 | -1 | -j | +1 | -j | -j | +1 |
| 30 | 011110 | -1 | +j | -j | +1 | +1 | -j | -j | +1 |
| 31 | 011111 | -j | -1 | +1 | +j | +1 | -j | -j | +1 |

*FIG. 1A*

| Code Index | | Length-8 Code Words | | | | | | | |
|---|---|---|---|---|---|---|---|---|---|
| 32 | 100000 | -1 | +1 | -1 | -1 | -1 | +1 | +1 | +1 |
| 33 | 100001 | -j | +j | -j | -j | -1 | +1 | +1 | +1 |
| 34 | 100010 | +1 | -1 | +1 | +1 | -1 | +1 | +1 | +1 |
| 35 | 100011 | +j | -j | +j | +j | -1 | +1 | +1 | +1 |
| 36 | 100100 | -j | +j | -1 | -1 | -j | +j | +1 | +1 |
| 37 | 100101 | +1 | -1 | -j | -j | -j | +j | +1 | +1 |
| 38 | 100110 | +j | -j | +1 | +1 | -j | +j | +1 | +1 |
| 39 | 100111 | -1 | +1 | +j | +j | -j | +j | +1 | +1 |
| 40 | 101000 | +1 | -1 | -1 | -1 | +1 | -1 | +1 | +1 |
| 41 | 101001 | +j | -j | -j | -j | +1 | -1 | +1 | +1 |
| 42 | 101010 | -1 | +1 | +1 | +1 | +1 | -1 | +1 | +1 |
| 43 | 101011 | -j | +j | +j | +j | +1 | -1 | +1 | +1 |
| 44 | 101100 | +j | -j | -1 | -1 | +j | -j | +1 | +1 |
| 45 | 101101 | -1 | +1 | -j | -j | +j | -j | +1 | +1 |
| 46 | 101110 | -j | +j | +1 | +1 | +j | -j | +1 | +1 |
| 47 | 101111 | +1 | -1 | +j | +j | +j | -j | +1 | +1 |
| 48 | 110000 | -j | +1 | -j | -1 | -j | +1 | +j | +1 |
| 49 | 110001 | +1 | +j | +1 | -j | -j | +1 | +J | +1 |
| 50 | 110010 | +j | -j | +j | +1 | -j | +1 | +j | +1 |
| 51 | 110011 | -1 | -j | -1 | +j | -j | +1 | +j | +1 |
| 52 | 110100 | +1 | +j | -j | -1 | +1 | +j | +j | +1 |
| 53 | 110101 | +j | -1 | +1 | -j | +1 | +j | +j | +1 |
| 54 | 110110 | -1 | -j | +j | +1 | +1 | +j | +j | +1 |
| 55 | 110111 | -j | +1 | -1 | +j | +1 | +j | +j | +1 |
| 56 | 111000 | +j | -1 | -j | -1 | +j | -1 | +j | +1 |
| 57 | 111001 | -1 | -j | +1 | -j | +j | -1 | +j | +1 |
| 58 | 111010 | -j | +1 | +j | +1 | +j | -1 | +j | +1 |
| 59 | 111011 | +1 | +j | -1 | +j | +j | -1 | +j | +1 |
| 60 | 111100 | -1 | -j | -j | -1 | -1 | -j | +j | +1 |
| 61 | 111101 | -j | +1 | +1 | -j | -1 | -j | +j | +1 |
| 62 | 111110 | +1 | +j | +j | +1 | -1 | -j | +j | +1 |
| 63 | 111111 | +j | -1 | -1 | +j | -1 | -j | +j | +1 |

APPARATUS AND METHOD OF EARLY-LATE SYMBOL TRACKING FOR A COMPLEMENTARY CODE KEYING RECEIVER

FIELD OF THE INVENTION

The present invention relates generally to a complementary code keying (CCK) receiver, and in particular, to an early-late symbol tracking architecture incorporating a Fast Walsh Transform (FWT).

BACKGROUND OF THE INVENTION

Complementary code keying is a variation on M-ary orthogonal keying (MOK) modulation, which uses an in-phase quadrature (I/Q) modulation architecture with complex symbol structures. CCK supports multi-channel operation in the unlicensed 2.4-GHz industrial-scientific-medical (ISM) band by using the existing IEEE 802.11 direct-sequence, spread spectrum (DSSS) channelization schemes. The spreading employs the same chipping rate and spectrum shape as the 802.11 Barker word-spreading functions, with three non-interfering channels in the 2.4-to-2.483-GHz band. Particular attention is directed to the May 1999 issue of *Wireless Systems Design*, and in particular, the article entitled "CCK Modulation Delivers 11 Mb/s for a High-Rate 802.11(b) Extension" on pages 31–39. The disclosure is incorporated herein by reference.

CCK is a version of "older" spread spectrum technologies. Spread spectrum technology, originally introduced in the 1920's, has evolved over a number of decades from uses in secured military applications to conventional wireless communication applications. Spread spectrum technology provides for organizing radio frequency energy over a wide range of frequencies and moving among the frequency range on a time divided basis.

Whenever signals are communicated, the potential for losing data or degradation of the communication signal may increase. Maintaining a synchronized timing base among a transmitter and a receiver is therefore paramount. If the synchronization or timing of transmission or arrival of a signal is off, then the information content of the signal cannot be recovered correctly. Thus, searching for a communication signal and tracking the communication signal are two of the most important synchronization responsibilities performed by a receiver. The searching process operates to find or locate possible signals in order to demodulate the received communication signal. The tracking process, in contrast, operates to track and receive the timing of the received communication signal. This is often accomplished using a tracking loop. Conventional tracking loops work to fine-tune the symbol timing.

Figure 1A:
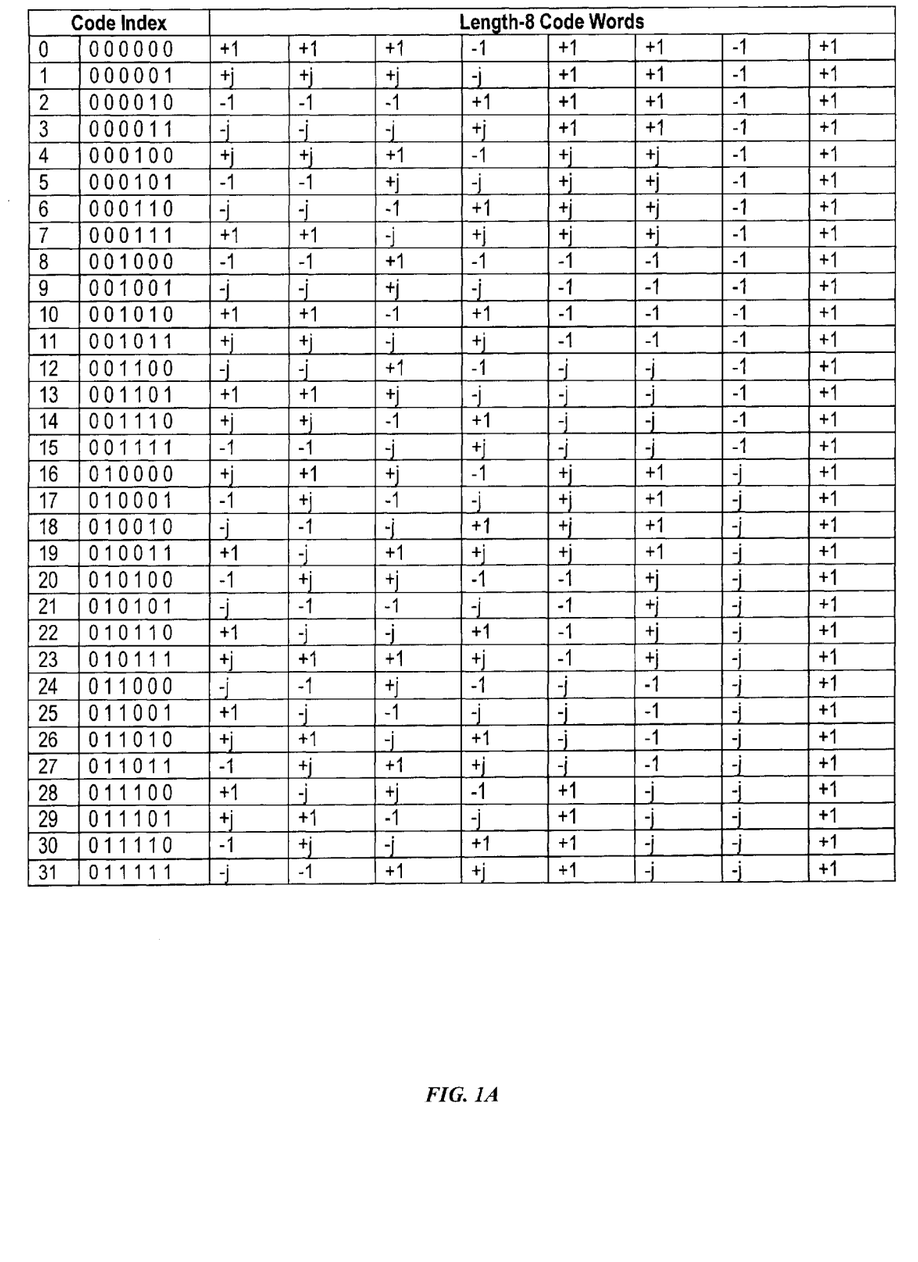
FIGS. 1A and 1B are a table showing a 64 code CCK code set.
Figure 1B:
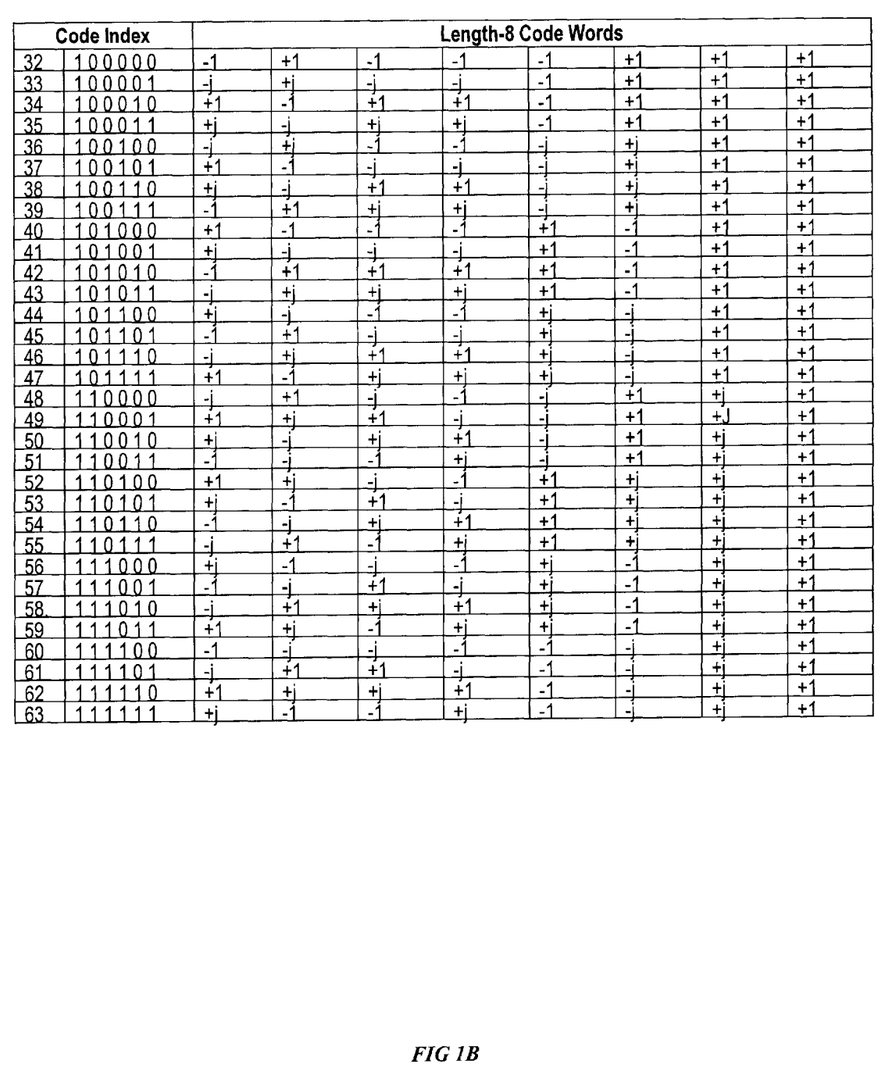

When transmitting data via CCK, multiple bits of data are used to determine a transmitted symbol, which is customary nomenclature for the transmitted signal corresponding to transmitted data. FIGS. 1A and 1B depict a CCK code set for a 64-word code index. The code index is the data to be transmitted, and the "length-8 code words" represent the corresponding symbols actually transmitted. Complementary code keying is a nearly orthogonal code set having real and imaginary components mapable on a constellation defined by a real and imaginary axis. From the CCK code set we can see the number 28 has a binary code index of 011100 with a corresponding symbol for transmission of [+1, −j, +j, −1, +1, −j, −j, +1]. For transmission and reception, the mapping of the data bits to transmitted symbols, and vice-versa, can be implemented by a look-up table or other technique customary in the art.

Figure 5:
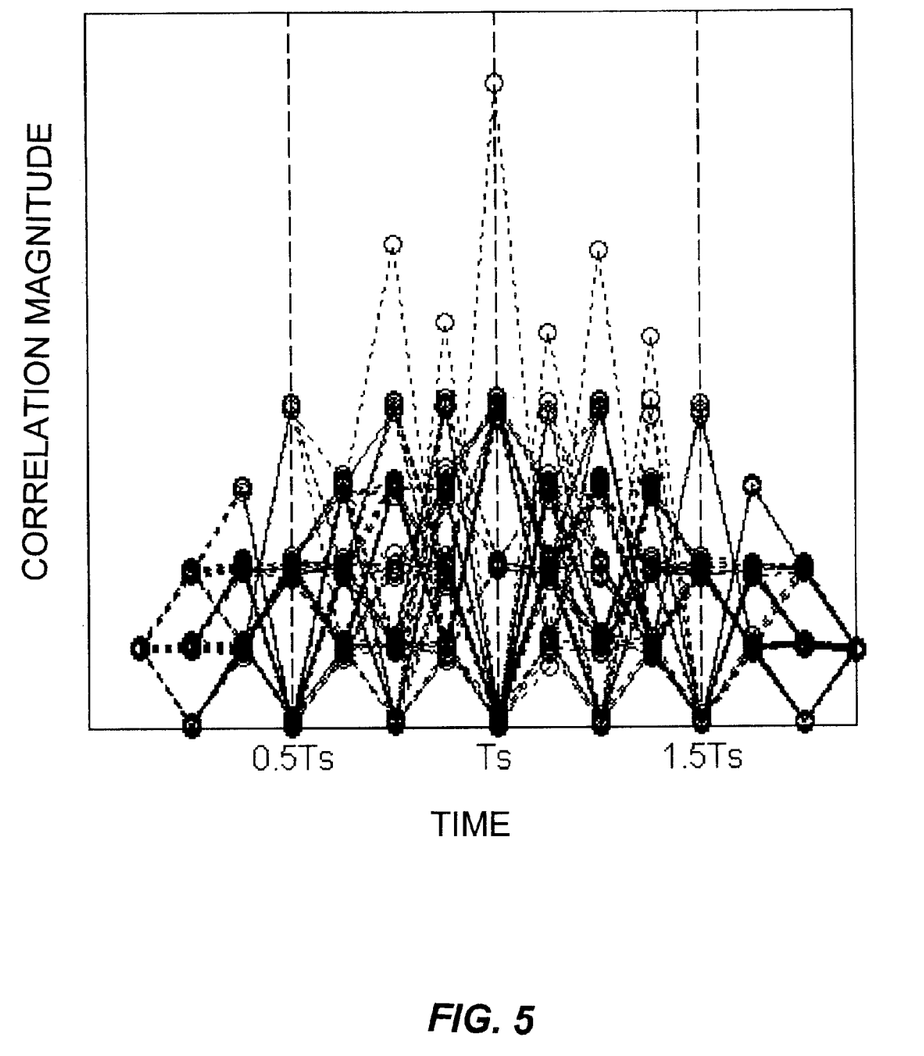
FIG. 5 is a graph showing the magnitude of all 64 outputs of a Fast Walsh Transform over a given symbol period.

At the receiver, the signal can be passed through 64 correlators to determine the transmitted symbol. A more efficient method of reception is to employ a single shift register and feed the parallel value created by the shift register into a Fast Walsh Transform (FWT) butterfly circuit. The FWT circuit creates 64 output values from 8 input values. The 64 outputs of the FWT circuit correspond to the cross-correlation outputs that would be created by implementing 64 correlators. From these 64 outputs, a decision for the symbol transmitted is made by picking the FWT output having the largest magnitude. FIG. 5 depicts the magnitude of all 64 outputs of the FWT over a symbol duration. Interestingly, as opposed to the 802.11 phase shift keyed (PSK) direct sequence spread spectrum system, there are multiple peaks of correlation. Given these multiple peaks, it is necessary to ensure that the symbol decision circuitry does not make decisions on "false" peaks.

As noted, decoding a CCK signal involves correlation of the received signal with all members of the set of orthogonal code words. The index of the code word giving the highest correlation yields the desired information. For example, if a signal's correlation produces the highest correlation on the tenth code word, the desired signal information is the binary word 001010 (ten).

Importantly, a received composite signal can be efficiently correlated simultaneously with the set of orthogonal code words using an FWT. In the case of a 64-code, six-bit index, 8 input composite signal chips are transformed into 64 measured correlation values, in which each value represents the value of the correlation of the composite signal with a respective code word. The FWT output values represent the degree of correlation between the received 8-chip symbol and each of the 64 code words. The maximal value in the measured correlation value identifies the proper code word, the index of which conveys six bits of information.

In spread spectrum communication systems, symbol timing is maintained only when the relative (time) alignment between the transmitter and receiver are synchronized. When code symbol timing cannot be guaranteed, errors result. Given the importance of synchronizing the receiver, and in particular, tracking the received signal to ensure proper correlation, there is a need for an efficient architecture and method for tracking the received signal in a CCK receiver.

SUMMARY OF THE INVENTION

The present invention provides early-late symbol tracking for a CCK receiver. The receiver receives a complex spread spectrum signal modulated using complementary code keying. The received signal is down converted and cross correlated with code words using a Fast Walsh Transform. The peak magnitudes resulting from the Fast Walsh Transform for a period before, during, and after an expected symbol boundary are monitored. The relative magnitudes of the early, on-time and late measurements are compared to determine which output has the largest magnitude. If the on-time measurement is the largest, symbol tracking continues without a timing adjustment. When the on-time measurement has the largest magnitude, symbol tracking for the prior symbol was synchronized, which indicates there is no need to change synchronization timing for the next symbol period. If the on-time measurement is not the largest in magnitude, then a determination is made as to which of the late or early measurements are the greatest in magnitude.

If the early measurement has the greatest magnitude, then the tracking timing is adjusted one period downward in order to shorten the period expected before the next symbol boundary. Alternatively, if the late measurement has the largest magnitude, then the tracking timing is increased by one sample period in order to increase the amount of time before the next expected symbol boundary. This process repeats itself to provide accurate symbol tracking.

BRIEF DESCRIPTION OF THE DRAWING FIGURES

The invention will be more fully understood from the following detailed description, in conjunction with the accompanying figures, wherein.

DETAILED DESCRIPTION OF THE PREFERRED EMBODIMENT

The invention is directed to an early-late symbol tracking architecture and method for complementary code keying data transmission systems. As such, the invention cooperates and is preferably integrated with CCK demodulation circuitry in a corresponding receiver. In order to facilitate a clear and concise understanding of the invention and its environment, a basic CCK demodulation method is described followed by the inventive symbol tracking method and a preferred architecture.

Figure 2:
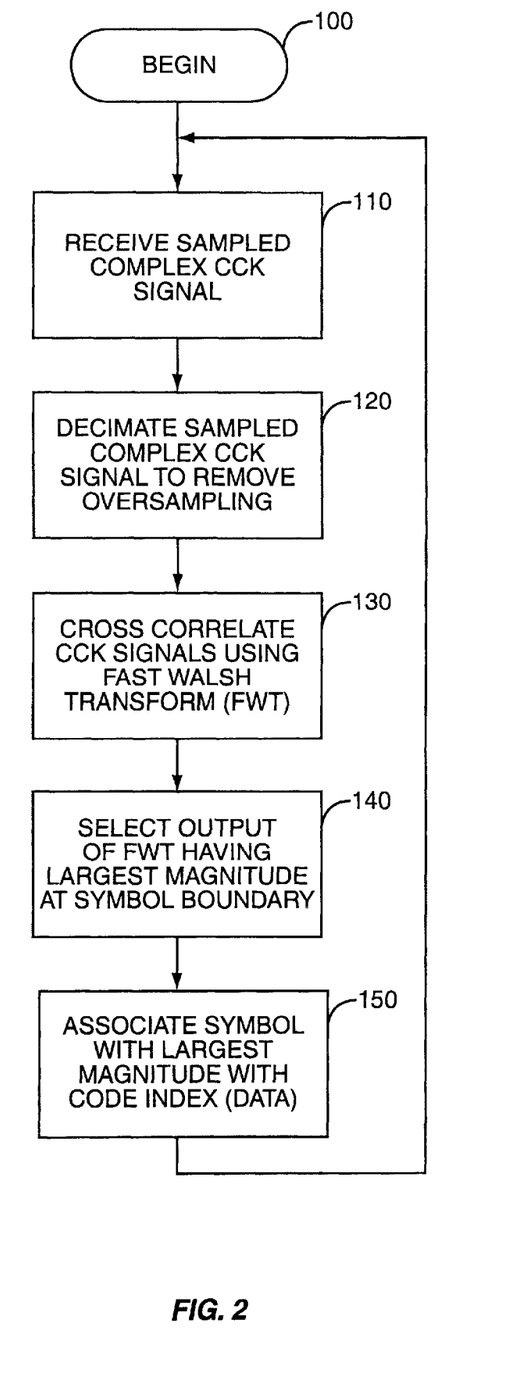
FIG. 2 is a flow chart outlining basic complementary code keying demodulation.

Typical flow for recovering data from a CCK signal is shown in FIG. 2. The process begins (block 100) with the reception of an oversampled, complex CCK signal (block 110). The complex CCK signal is then decimated to remove oversampling and to convert the complex signal down to its basic CCK codes (block 120). This resultant CCK signal is cross correlated with code words using an FWT (block 130). In a 64-code system, there are 64 complex signals output from the FWT. These FWT outputs represent the most likely received chipping sequences, which correlate to the transmitted code words. Given the inherent characteristics of a Walsh transform, the most likely code word transmitted corresponds with the complex signal having the greatest magnitude. As such, the output of the FWT having the largest magnitude is selected (block 140). Each chipping sequence representing a code word defines a symbol. The code word for the symbol associated with the FWT output having the largest magnitude is then associated with a corresponding code index, which represents the most likely data originally transmitted.

FIG. 5 represents a graph depicting the magnitudes for the 64 correlation outputs over a given symbol period. As is readily appreciated, it is important to look for the maximum output of the FWT at the proper time in a consistent manner. With respect to the present invention, synchronization of the receiver, and in particular, tracking the incoming symbols, is preferably carried out according to the process in FIG. 3. The process begins (block 200) wherein the peak magnitudes of the FWT output, for each of the 64 complex signals, are monitored on and about the expected symbol boundaries in an early-late fashion. Preferably, the maximum magnitude of the FWT output is monitored one sample period prior to the expected symbol boundary (early) (block 210). Next, the maximum magnitude of the FWT output at expected symbol boundary (on-time) is monitored (block 220). Finally, the maximum magnitude of the FWT output one period after the expected symbol boundary (late) is monitored (block 230). Preferably, the early and late output measurements occur one sample period before and after the expected symbol boundary, although any timing of early and late monitoring would not depart from the invention.

Figure 3:
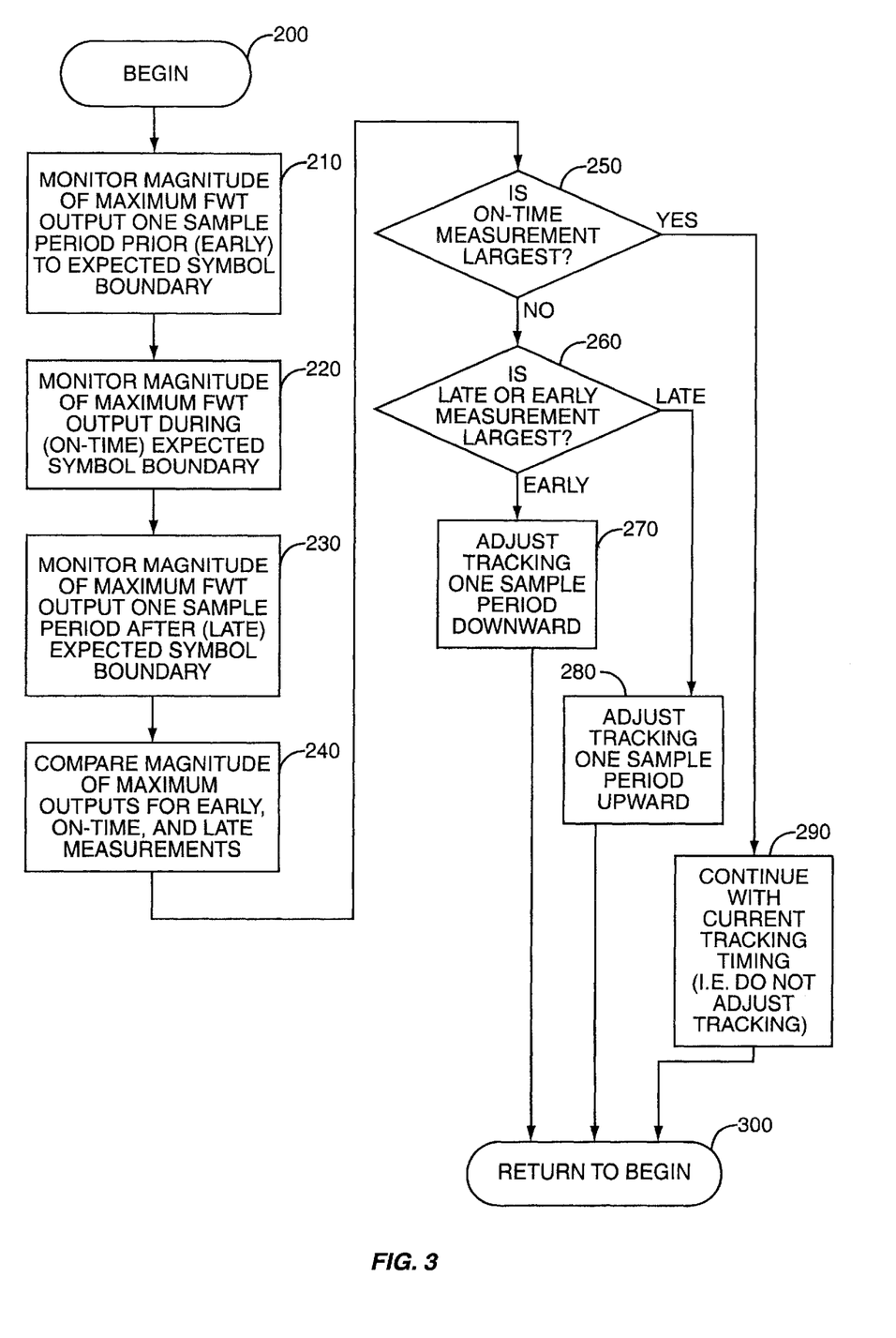
FIG. 3 is a flow chart depicting symbol tracking based on early-late Fast Walsh Transform analysis.

Once the early, on-time and late magnitudes are monitored, the relative magnitudes of these maximum signals are compared (block 240). If the on-time maximum output is the largest in magnitude (block 250), symbol tracking continues without a timing adjustment (block 290) and the process repeats (block 300). If the on-time measurement is not the largest in magnitude (block 250), then a determination is made as to which of the late or early measurements are of the greatest magnitude (block 260). If the early measurement has the greatest magnitude, then the tracking timing is adjusted one sample period downward in order to shorten the period expected before the next symbol boundary, and the process repeats (block 300). If the late measurement has the largest magnitude (block 260), then the tracking timing is increased by one sample period (block 280) in order to increase the amount of time before the next expected symbol boundary, and the process repeats (block 300).

As such, in an iterative process for each received symbol, if the expected symbol boundary does not correspond with the FWT output having the largest magnitude, the timing for the next expected symbol time is adjusted. In keeping with our example of monitoring and adjusting timing according to the sample periods, if a symbol is expected to arrive every 32 sample clocks, running from 0–31, the output of the FWT is monitored at sample 30 (early), 31 (expected time), and 0 (late). If the peak magnitude of the three periods occurs at sample 31 (expected), no adjustment is made. If the peak occurs at period 30, on the next symbol, tracking adjustments are made to investigate magnitudes of counter time 29 (early), 30 (expected) and 31 (late). If the peak occurs at period 0, on the next symbol, adjustments are made to monitor magnitudes at period 31 (early), 0 (expected), and 1 (late).

Figure 4A:
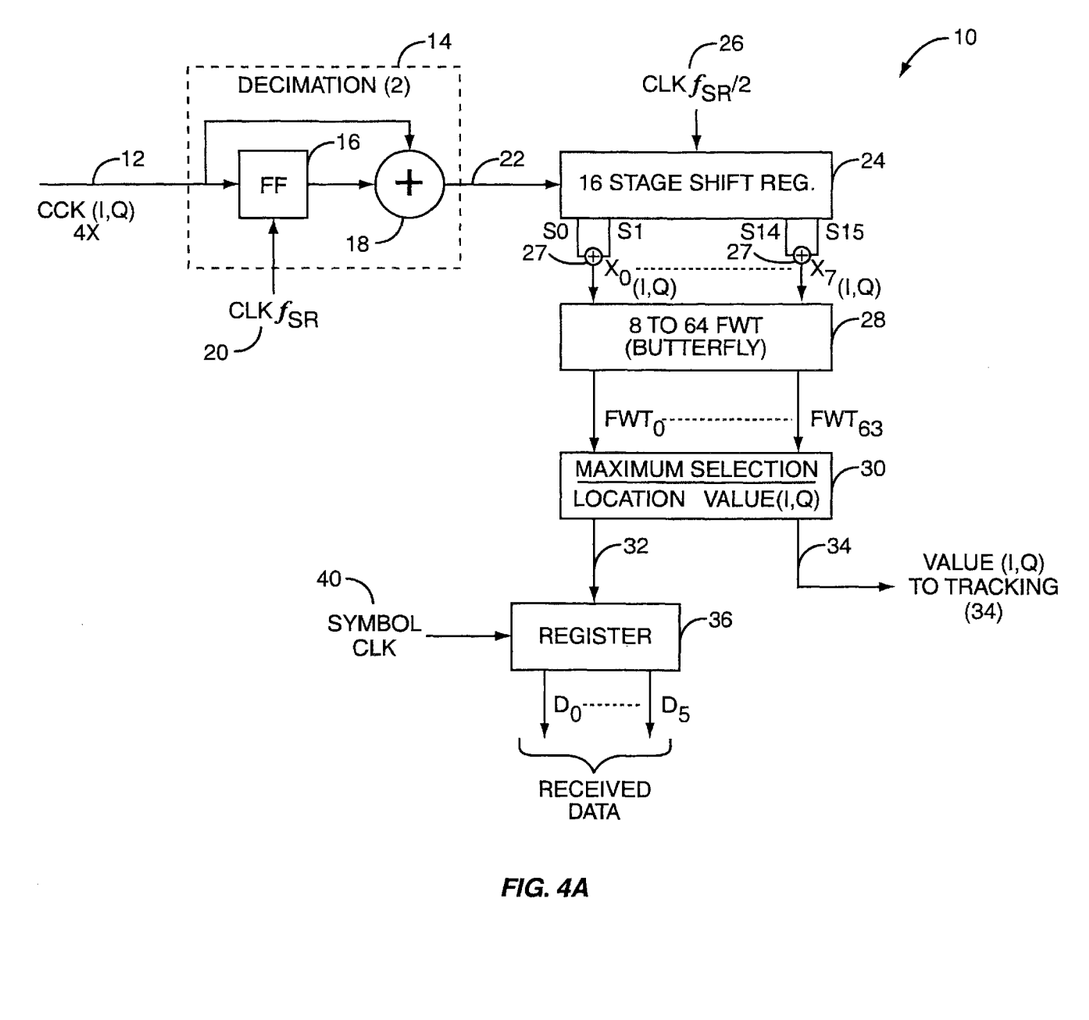
FIGS. 4A and 4B provide a block diagram of a complementary code keying receiver and associated tracking circuitry according to the present invention.
Figure 4B:
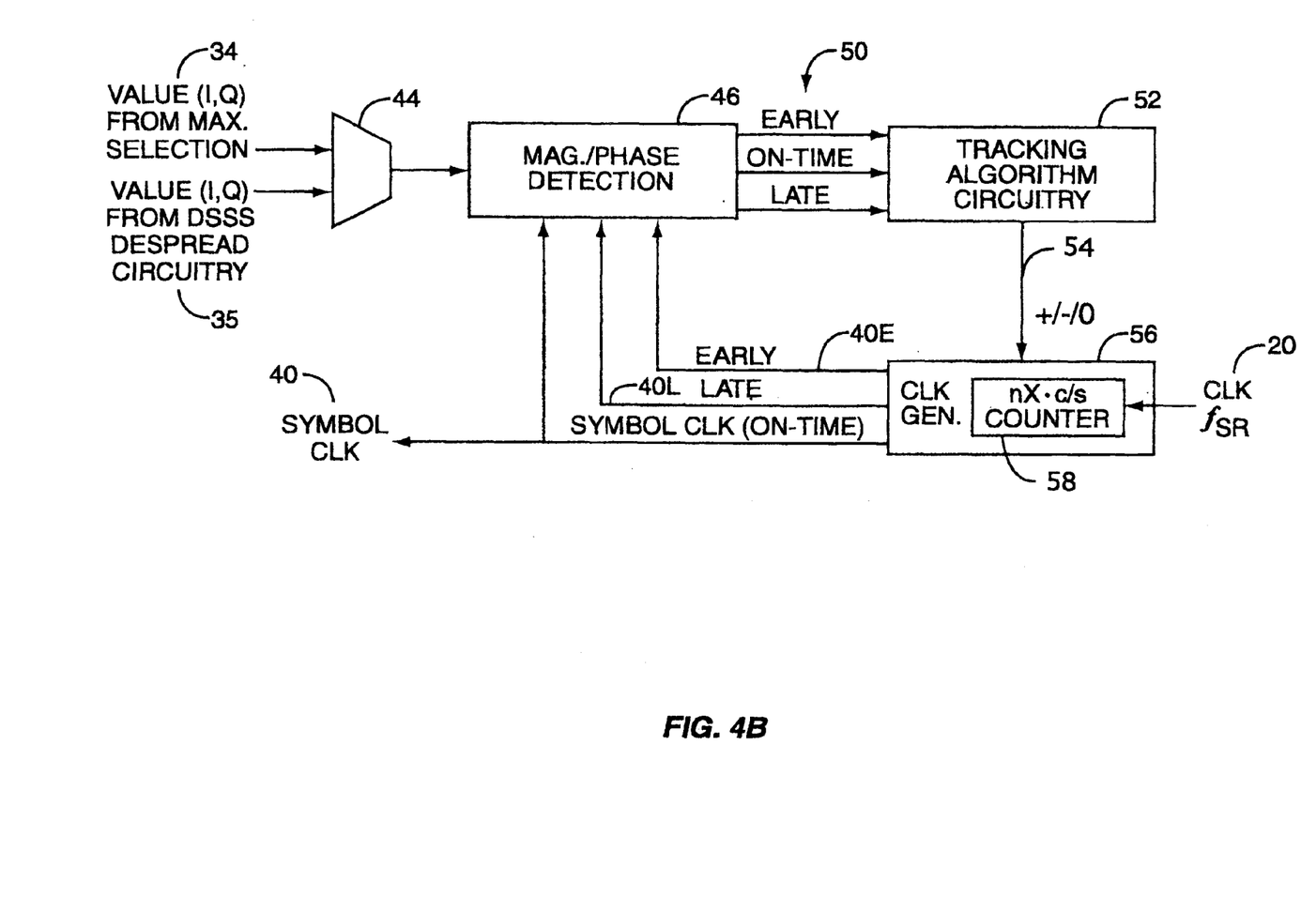

FIGS. 4A and 4B provide a block schematic for an FWT-based CCK receiver and tracking circuitry configured according to the present invention. A CCK receiver, generally referenced as 10 is depicted. The receiver 10 is configured to recover a complex CCK signal 12 having a real and imaginary component. Preferably, the complex CCK signal 12 has been oversampled at the receiver front end circuitry (not shown). For this example, assume that the complex CCK signal 12 was digitized using four times oversampling. Further assume a 64-word CCK code set having 8-chip code words and 6-bit code indexing as shown in FIGS. 1A and 1B.

Figure 4C:
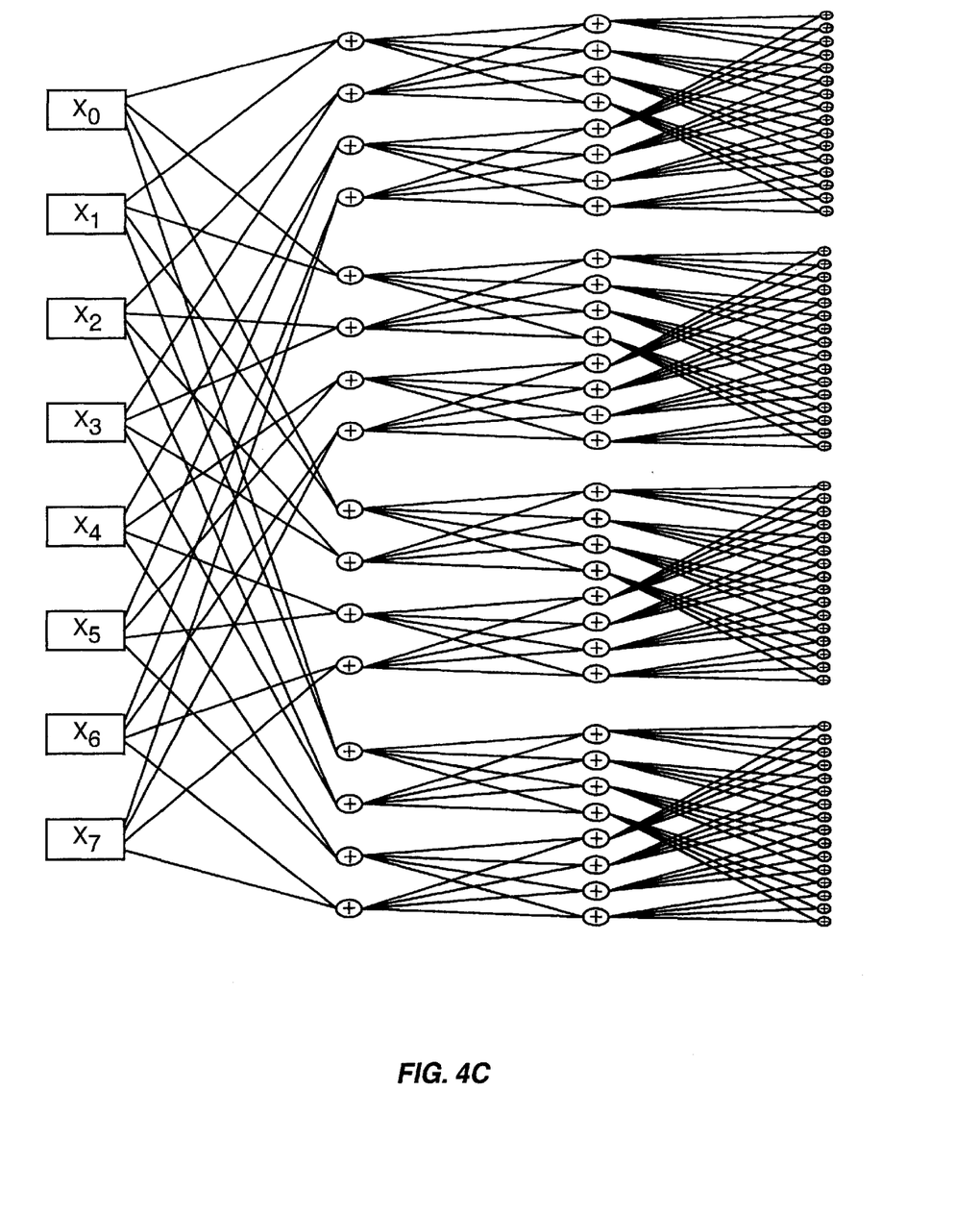
FIG. 4C is a block diagram of an exemplary butterfly circuit.

Initially, the complex CCK signal 12 is passed through decimation circuitry 14 to effectively reduce the sampling rate of the complex CCK signal 12 to two times the chip rate of eight chips per symbol. The decimation circuitry incorporates a register, such as flip flop 16, and summation circuitry 18 to effectively sum the samples corresponding to a particular chip. Preferably, the decimation circuitry is clocked at the sample rate 20 to provide a decimated CCK signal 22. The decimated CCK signal 22 is serially shifted into a 16-stage shift register 24, which is clocked at one-half the sample rate 26. The outputs of the shift register are summed pair-wise using summing circuitry 27 to produce eight complex signals represented as $X_0$ (I,Q) through $X_7$ (I,Q). Notably, the shift register 24 acts as a low-pass filter in that the output $X_0$ equals the sum of the first and second bits and output $X_7$ equals the sum of the $15^{th}$ and $16^{th}$ bits. The outputs $X_0$ through $X_7$ are fed to FWT butterfly circuitry 28, which is depicted in FIG. 4C, to perform a Fast Walsh Transform on inputs $X_0$ through $X_7$. Inputs $X_0$ through $X_7$ typically represent a received symbol consisting of eight chips. The FWT butterfly circuitry provides 64 outputs $FWT_0$ through $FWT_{63}$ (i.e. cross-correlation with the 64 possible code words). These outputs represent the Fast Walsh Transform of the input $X_0$ through $X_7$. The rectangular boxes represent the inputs $X_0$ through $X_7$. The ovals represent summing circuitry, and each line connecting the boxes and ovals represents a multiplication function, wherein the multiple is 1,j,−1 or −j as necessary to provide the 64 cross correlations. This butterfly circuitry is well known in the art.

These outputs represent likely chipping sequences corresponding to the transmitted data. The most likely chipping sequence corresponds to the output having the largest magnitude. As such, each of the 64 outputs $FWT_0$ through $FWT_{63}$ is sent to maximum selection circuitry 30. The maximum selection circuitry 30 detects the largest output and provides a corresponding code location 32 and a complex value 34 representative of the recovered code word. The location information is preferably the six-bit data value corresponding to the most likely code word. This six-bit value is typically clocked into a six-bit register 36 using a symbol clock 40 to latch the data bits $D_0$ through $D_5$ corresponding to the six-bit output.

As noted, the maximum selection circuitry outputs a complex value signal 34 that represents the rectangular coordinates associated with the most likely received code word. The complex value signal 34 is sent to a multiplexer 44 and into magnitude and phase detection circuitry 46. The multiplexer 44 is preferably used to select between despread PSK signals 35 and CCK signals. The magnitude and phase detection circuitry 46 is capable of detecting the magnitude of the complex value signal and the phase associated therewith. The circuitry may take the form of a CORDIC, which is well known to those skilled in the art. In the latter case, there is a CORDIC and multiplexer for each of the late, early, and on time signals.

Importantly, the magnitude and phase detection circuitry 46 is configured to trigger on three clock signals. For ease of understanding, these three signals are shown separately. Clock symbols 40 represent the symbol clock having timing set to trigger on the expected boundary of the next symbol. An early symbol clock 40E is set to trigger one sample period before the symbol clock 40. A late symbol clock 40L is set to trigger one sample period after the triggering of signal clock 40. Each of these clock signals 40, 40E, 40L may be provided by the same or separate signal paths to the magnitude and phase detection circuitry 46. Regardless of configuration, the magnitude and phase detection circuitry 46 receives early, on-time, and late symbol clocks 40E, 40, 40L to trigger the determination of the magnitude of the value signal 34 at three different sample periods. These respective early, on-time and late magnitudes 50 are sequentially or simultaneously provided to tracking algorithm circuitry 52, which determines which of the three magnitudes is greatest. Depending on which of the early, on-time, or late magnitudes is greatest, a tracking control signal 54 is provided to clock generator circuitry 56.

In the preferred embodiment, the clock generator circuitry is associated with a counter 58 being clocked at the sample rate 20. The counter is set to count for the expected number of sample periods for a given symbol and provide an output correlating to the symbol boundary, which is the on-time symbol clock 40. Based on the counter and tracking signal 54, the clock generator also provides the early and late symbol clocks 40E, 40L. As discussed, the early and late symbol clocks 40E, 40L may provide triggers one sample period before and after the symbol clock 40, respectively.

During operation, if the tracking algorithm circuitry 52 determines that the expected on-time magnitude is greater than the early and late magnitudes, the counter continues tracking by counting down the theoretical number of samples per symbol. Since this example assumes two times (2×) oversampling, and an eight-chip code word, the counter will count from 0 to 15 (16 sample periods) for on-time, synchronized tracking. If the on-time magnitude is not the largest, the counter value is adjusted accordingly. For example, for on-time tracking, the magnitude of the value signal 34 is monitored at counter time 14 (early), 15 (on-time), and 0 (late). If the peak magnitude occurs at 15 (on-time) no adjustments are made to the counter, thus, counting continues from 0 to 15. If the peak occurs at 14, on the next symbol, adjustments are made according to tracking signal 54 to monitor magnitudes at counter time 13 (early), 14 (on-time), and 15 (late). These adjustments are made by triggering the early, on-time, and late symbol clocks 40E, 40, 40L accordingly. A similar correction is made if the peak occurs at the late symbol wherein the early, on-time, and late symbol clocks 40E, 40, 40L correspond to counter time 15 (early), 0 (on-time), and 1 (late). Thus, the invention is capable of tracking symbols at their boundaries using early-late processing of symbol magnitudes derived from a Fast Walsh Transform.

The present invention may use existing circuitry necessary for demodulation of direct sequence spread spectrum (DSSS) signals and an early-late pseudo-noise (PN) tracking loop. In early-late tracking of DSSS symbols, a DSSS receiver includes circuitry capable of creating three pseudo-noise signals for early, on-time, and late timing. The early PN signal has a phase offset relative to the on-time PN signal minus one sample period. Likewise, the phase of the late PN signal has a phase offset relative to the on-time PN signal plus one sample period. The absolute phase of each PN signal is determined by the aforementioned counter and a phase offset signal created by a tracking algorithm customary to early-late tracking and DSSS receivers. The incoming signal is multiplied by each PN signal and integrated over a given symbol period. The symbol period is determined by the PN generator, which determines when the phase wraps 360°. The output of each integration circuit is fed to circuitry to extract the magnitude of the integrated signal. The magnitudes of the early, on-time and late correlations are then compared with tracking circuitry to determine which correlator has the maximum value. If the on-time correlation contains the maximum value, no changes to the phase offsets need be made. If the early or late correlators contain the maximum value, the phase offset generated by the tracking algorithm block will be adjusted to ensure that in the next symbol, the on-time correlator contains the maximum magnitude.

By using the existing structure for early-late tracking in DSSS circuitry, the counter, magnitude extraction circuitry and tracking algorithm circuitry may be used in association with the present invention. For example, the received signal is first passed to the shift register 24 and then to the FWT circuitry 28. The 64 outputs of the FWT circuitry 28 are passed to maximum selection circuitry 30 to determine the maximum value of the corresponding Fast Walsh Transform. This output is then passed to the magnitude extraction circuitry 46 present in the DSSS architecture. The tracking algorithm circuitry 52 is substantially identical in both CCK and DSSS mode. The PN generator and counter in the DSSS circuitry may be used to generate the symbol clock that will track the peak magnitude and keep this magnitude.

Although the present invention has been described in detail, those skilled in the art should understand that they can make various changes, substitutions and alterations herein without departing from the spirit and scope of the invention in its broadest form.

What is claimed is:

1. Symbol tracking circuitry for tracking symbols in a complementary code keying (CCK) spread spectrum receiver, said symbol tracking circuitry comprising:
   a. Fast Walsh Transformation (FWT) circuitry adapted to receive a processed CCK signal and to provide a plurality of FWT output signals corresponding to most likely code words of the processed CCK signal;
   b. maximum selection circuitry adapted to receive the FWT output signals and to provide:
      i. a value signal corresponding to an FWT output signal having the largest value; and
      ii. location data corresponding to the one FWT output signal having the largest value, said location data corresponding to transmitted data;
   c. magnitude detection circuitry adapted to receive the value signal and to provide a corresponding output magnitude signal representing the magnitude of the value signal; and
   d. tracking circuitry for receiving a first magnitude signal corresponding to a time period prior to an expected symbol boundary, a second magnitude signal corresponding to time at the expected symbol boundary, and a third magnitude signal corresponding to a time period after the expected symbol boundary and for providing a symbol clock signal for a subsequent signal based on the magnitude signal having the greatest magnitude for the time prior to, at, and after the expected symbol boundaries.

2. The symbol tracking circuitry of claim 1 wherein said time period prior to an expected boundary is one sample period prior to said expected symbol boundary and said time period after an expected boundary is one sample period after said expected symbol boundary.

3. The symbol tracking circuitry of claim 1 wherein said tracking circuitry includes a counter adapted to provide a trigger signal after a standard number of counts, which corresponds to a symbol period, and is adapted to:
   a. reduce the standard number of counts if said magnitude signal having the greatest magnitude corresponds to the time period prior to the expected symbol period, and
   b. increase the standard number of counts if said magnitude signal having the greatest magnitude corresponds to the time period prior to the expected symbol period, said symbol clock signal corresponding to said trigger signal.

4. The symbol tracking circuitry of claim 1 wherein said magnitude detection circuitry receives the symbol clock signal to trigger magnitude detection at the expected symbol boundary, a trigger prior to said symbol clock signal to trigger magnitude detection prior to the expected symbol boundary, and a trigger after said symbolclock signal to trigger magnitude detection after the expected symbol boundary.

5. The symbol tracking circuitry of claim 1 further comprising a register configured to receive said location data upon receipt of said symbol clock signal, said registered data corresponding to the most likely data transmitted for a given symbol.

6. The symbol tracking circuitry of claim 1 wherein the value signal is a complex signal having real and imaginary components.

7. The symbol tracking circuitry of claim 1 wherein said FWT circuitry incorporates butterfly circuitry configured to implement a Fast Walsh Transform.

8. An apparatus for early-late symbol tracking in a complementary code keying (CCK) receiver, wherein a received CCK signal includes symbols corresponding to code words in a CCK code set and a Fast Walsh Transformation provides, for each symbol, location data to determine the transmitted code word and a complex value signal, said apparatus comprising circuitry to detect the magnitude of the complex value signal before, during and after the expected symbol boundary and to trigger the symbol clock early if the magnitude of the complex value signal before the expected symbol boundary is greatest, to trigger the symbol clock on-time if the magnitude of the complex value signal during the expected symbol boundary is greatest, and to trigger the symbol clock late if the magnitude of the complex value signal after the expected symbol boundary is greatest, said signal clock signaling the boundary of a received symbol.

9. The apparatus of claim 8 wherein said circuitry is adapted to detect the magnitude of the complex value signal one sample period before the expected symbol boundary and the magnitude of the complex value signal after the expected symbol boundary wherein there is a sample period for each of a plurality of samples digitally representing one symbol period.

10. Symbol tracking circuitry for tracking symbols in a complementary code keying (CCK) spread spectrum receiver, said symbol tracking circuitry comprising:
   a. means for performing a Fast Walsh Transformation (FWT) on a processed CCK signal and for providing a plurality of FWT output signals corresponding to most likely code words of the processed CCK signal;
   b. means for receiving the FWT output signals and for providing:
      i. a value signal corresponding to an FWT output signal having the largest value, and
      ii. location data corresponding to the one FWT output signal having the largest value, said location data corresponding to transmitted data;
   c. means for receiving the value signal and providing a corresponding output magnitude signal representing the magnitude of the value signal; and
   d. means for receiving a first magnitude signal corresponding to a time period prior to an expected symbol boundary, a second magnitude signal corresponding to time at the expected symbol boundary, and a third magnitude signal corresponding to a time period after the expected symbol boundary and for providing a symbol clock signal for a subsequent signal based on the magnitude signal having the greatest magnitude for the time prior to, at, and after the expected symbol boundaries.

11. The symbol tracking circuitry of claim 10 wherein said time period prior to an expected boundary is one sample period prior to said expected symbol boundary and said time period after an expected boundary is one sample period after said expected symbol boundary.

12. The symbol tracking circuitry of claim 10 further including means for providing a trigger signal after a standard number of counts, which corresponds to a symbol period; means for reducing the standard number of counts if said magnitude signal having the greatest magnitude corresponds to the time period prior to the expected symbol period; and for increasing the standard number of counts if said magnitude signal having the greatest magnitude corresponds to the time period prior to the expected symbol period wherein said symbol clock signal corresponds to said trigger signal.

13. A method for tracking symbols in a complementary code keying (CCK) spread spectrum receiver, said method comprising:
   a. performing a Fast Walsh Transformation (FWT) on a processed CCK signal and providing a plurality of FWT output signals corresponding to most likely code words of the processed CCK signal;
   b. providing a value signal corresponding to an FWT output signal having the largest value;
   c. providing location data corresponding to the one FWT output signal having the largest value, said location data corresponding to transmitted data;
   d. providing a corresponding output magnitude signal representing the magnitude of the value signal;
   e. receiving a first magnitude signal corresponding to a time period prior to an expected symbol boundary, a second magnitude signal corresponding to time at the expected symbol boundary, and a third magnitude signal corresponding to a time period after the expected symbol boundary; and
   f. providing a symbol clock signal for a subsequent signal based on the magnitude signal having the greatest magnitude for the time prior to, at, and after the expected symbol boundaries.

14. The method of claim 13 wherein said time period prior to an expected boundary is at least one sample period prior to said expected symbol boundary and said time period after an expected boundary is at least one sample period after said expected symbol boundary.

15. The method of claim 13 further including the step of providing a trigger signal after a standard number of counts, which correspond to a symbol period, and means for reducing the standard number of counts if said magnitude signal having the greatest magnitude corresponds to the time period prior to the expected symbol period and increase the standard number of counts if said magnitude signal having the greatest magnitude corresponds to the time period after the expected symbol period wherein said symbol clock signal corresponds to said trigger signal.

16. A method for early-late symbol tracking in a complementary code keying (CCK) receiver, wherein a received CCK signal includes symbols corresponding to code words in a CCK code set and a Fast Walsh Transformation provides, for each symbol, location data to determine the transmitted code word and a complex value signal, said method comprising:
   a. detecting the magnitude of the complex value signal before, during and after the expected symbol boundary;
   b. triggering the symbol clock early if the magnitude of the complex value signal before the expected symbol boundary is greatest;
   c. triggering the symbol clock on-time if the magnitude of the complex value signal during the expected symbol boundary is greatest; and
   d. triggering the symbol clock late if the magnitude of the complex value signal after the expected symbol boundary is greatest, said signal clock signaling the boundary of a received symbol.

17. The method of claim 16 wherein further comprising the steps of:
   a. providing a trigger signal after a standard number of counts, which corresponds to a symbol period;
   b. reducing the standard number of counts if said magnitude signal having the greatest magnitude corresponds to a time period prior to the expected symbol period; and
   c. increasing the standard number of counts if said magnitude signal having the greatest magnitude corresponds to a time period after the expected symbol period wherein said symbol clock signal corresponds to said trigger signal.

* * * * *